Patented Oct. 6, 1936

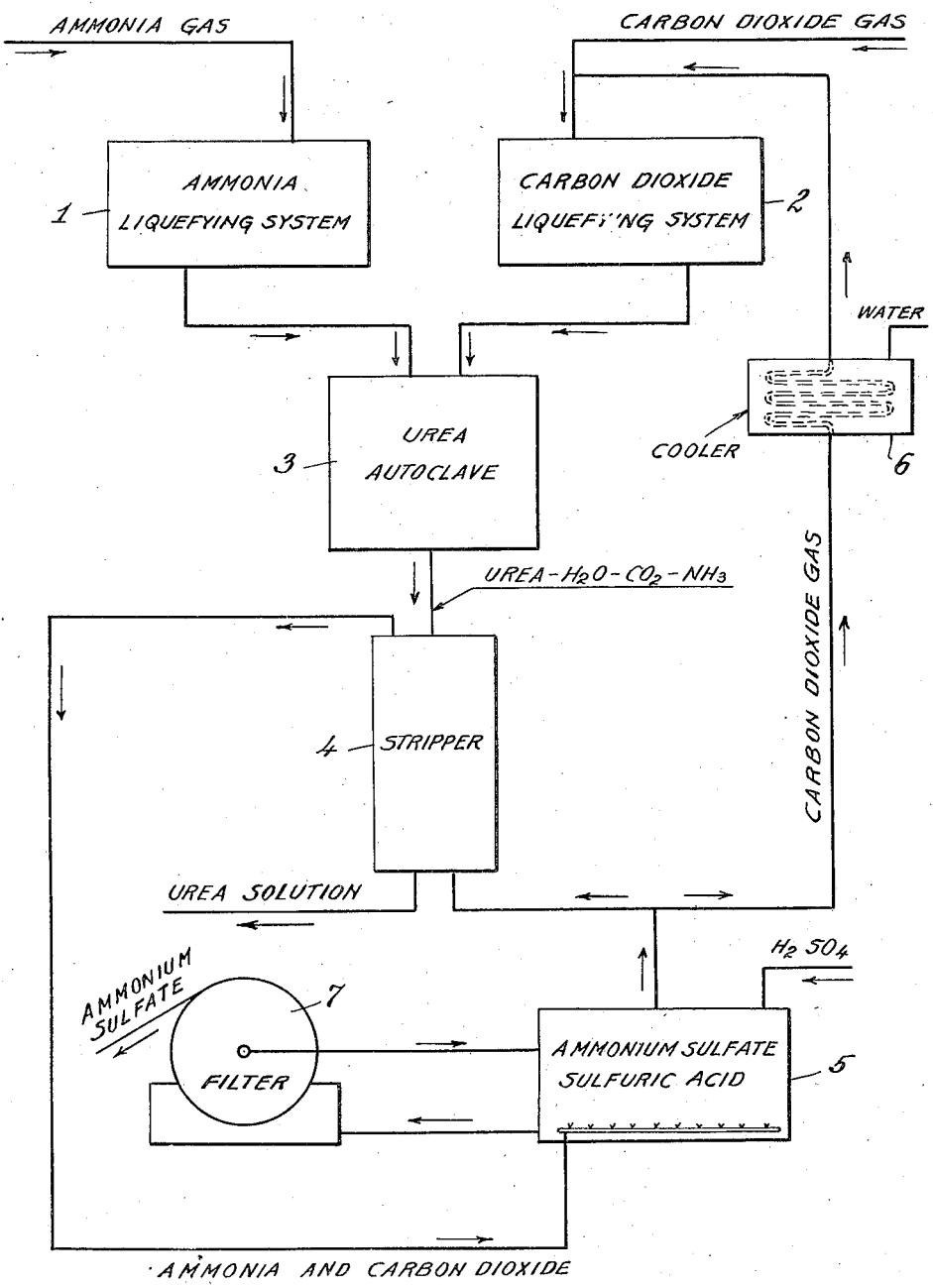

2,056,283

UNITED STATES PATENT OFFICE 2,056,283

PROCESS FOR THE PRODUCTION OF UREA AND AN AMMONIUM SALT

Charles K. Lawrence, Syracuse, N. Y., and Herman A. Beekhuis, Jr., Petersburg, Va., assignors to Atmospheric Nitrogen Corporation, New York, N. Y., a corporation of New York Application September 13, 1933, Serial No. 689,247

10 Claims. (Cl. 260—125)

This invention relates to a process for the production of urea and an ammonium salt such as ammonium nitrate, ammonium sulfate, ammonium chloride, and the like.

It is known to produce urea by heating ammonia and carbon dioxide under pressure to convert the materials into urea in accordance with the following equation: $2NH_3 + CO_2 = (NH_2)_2CO + H_2O$. This reaction under the conditions employed for carrying it out does not go to completion so that the reaction product recovered from an autoclave in which synthesis of urea is carried out contains in addition to the urea and water (the products of the above reaction) a considerable proportion of ammonia and carbon dioxide, principally in the form of ammonium carbamate or carbonate.

One of the major problems in developing a commercially satisfactory method for the synthesis of urea from ammonia and carbon dioxide has been the provision of satisfactory methods for recovering the unconverted ammonia and carbon dioxide from the effluent of the urea autoclave. Heretofore it has been proposed to heat the effluent to drive out the unconverted ammonia and carbon dioxide and return these materials to the autoclave for the production of further quantities of urea. In one process, the ammonia and carbon dioxide distilled from the autoclave effluent are directly compressed without separation for return to the autoclave. This compression, however, must be carried out at high temperatures to avoid the formation of solid ammonium carbamate, which high temperature compression involves mechanical difficulties and low efficiencies of the compression step. It has also been proposed to separate the ammonia from the carbon dioxide as, for example, by selective absorption of the ammonia and then recovering the gases separately and separately recompressing them and returning them to the urea synthesis autoclave. Such a mode of operation, however, is costly and adds appreciably to the cost of the urea synthesis.

It is an object of this invention to provide a method for the production of valuable ammonium salts from the unconverted ammonia in the urea synthesis effluent which obviates the necessity of recovering both the ammonia and carbon dioxide for reuse in the urea synthesis process itself and in which the value of the ammonium salt compensates for the cost involved in its production. It is furthermore an object of this invention to provide a novel method for the effective elimination of unconverted ammonia and carbon dioxide from a urea synthesis effluent and the recovery and use of the constituents of the gaseous mixture thus obtained.

In carrying out the process of this invention ammonia and carbon dioxide, preferably in amount such that the ammonia is in excess of that required for reaction with the carbon dioxide to form urea, i. e. more than 2 mols of ammonia for every 1 mol. of carbon dioxide, are heated under an elevated pressure to form urea. The resulting product is treated to recover the unconverted ammonia and carbon dioxide. This may be accomplished by relieving the pressure on the hot melt formed and by heating it to volatilize the ammonia and carbon dioxide. It is preferred, as described below, to pass carbon dioxide gas in contact with the hot melt to strip from it unconverted ammonia and carbon dioxide. The mixture of carbon dioxide and ammonia thus recovered is passed in contact with an acid material to absorb the ammonia with the formation of an ammonium salt. A portion of the carbon dioxide gas from which the ammonia is thus separated may be recycled in contact with melt from the urea synthesis to aid in removing ammonia and carbon dioxide while the remainder of the carbon dioxide is returned for reuse in the urea synthesis step.

The accompanying drawing shows diagrammatically a process illustrative of this invention. Referring to the drawing, ammonia gas is compressed and liquefied in an ammonia liquefying system 1 and a carbon dioxide gas is compressed and liquefied in a carbon dioxide liquefying system 2. The liquid ammonia and carbon dioxide are continuously fed into a urea autoclave 3 where the materials are heated at a temperature of about 150° C. to 200° C. under a pressure of about 100 to 300 atmospheres. Under these conditions urea is formed and the product containing urea and unconverted ammonia and carbon dioxide is continuously withdrawn from the autoclave and passed into the top of a stripper 4 in which a pressure materially below that of autoclave 3 is maintained, for example, a pressure of a few pounds gauge. As the effluent from the autoclave at an elevated temperature is introduced into stripper 4 at the lower pressures, ammonia and carbon dioxide are evolved from the melt. Gaseous carbon dioxide is introduced into the bottom of stripper 4 and passed in contact with the warm autoclave effluent descending through the stripper. The carbon dioxide may be preheated or heating coils may be provided in the stripper to supply a desired amount of heat in addition to that contained in the autoclave effluent, which, at the top of the stripper, may have a temperature of, for example, 100° C., to eliminate the unconverted carbon dioxide and ammonia from the autoclave effluent with substantial completeness. Also, steam may be introduced with the carbon dioxide entering the bottom of the stripper to supply a desired amount of heat. If desired, this steam may be introduced into the stripper at an intermediate point instead of into the bottom of the stripper. A gaseous mixture of carbon dioxide and ammonia is withdrawn from the top of stripper 4. While maintaining this mixture at a temperature above that at which solid ammonium carbonate would form, the gaseous mixture is passed to a vessel 5 and in that vessel is contacted with a saturated solution of ammonium sulfate containing about 5% free sulphuric acid at a temperature of about 110° C. 60° Bé. sulfuric acid and water are fed continuously into vessel 5 at such rates as to maintain the acidity and the volume of the solution constant. Ammonium sulfate is removed from the solution as it is formed by continuously withdrawing liquor and crystallized ammonium sulfate from the vessel to a filter 7 in which the solid and solution are separated and the solution is returned to vessel 5. The carbon dioxide separated from the ammonia in vessel 5 is in part recirculated through stripper 4. The remaining carbon dioxide may be cooled in a cooler 6 to remove the bulk of the water it contains and is then returned to carbon dioxide liquefying system 2 for the production of additional quantities of urea. The urea solution from stripper 4 substantially free from unconverted ammonia and carbon dioxide may be treated in any desired manner for the recovery of the urea.

Nitric acid, hydrochloric acid or phosphoric acid may be employed in place of sulfuric acid for the separation of the ammonia from the carbon dioxide with the production of the corresponding ammonia salt.

The following methods for the production of ammonium salts are further illustrative of this invention:

A solution containing both ammonium nitrate and mono-ammonium phosphate may be obtained while recovering unconverted ammonia and carbon dioxide from the urea synthesis effluent by treating the effluent in a stripper through which heated carbon dioxide is passed at such a rate that the gas at the top of the stripper contains about 10% ammonia. The ammonia-carbon dioxide mixture is then passed countercurrent to a solution containing 40% $NH_4NO_3$, 10% $H_3PO_4$ and 50% $H_2O$, which is circulated through an absorption tower. The flows of gas and liquor are so proportioned that the gas leaving the tower contains only carbon dioxide and water vapor, the ammonia being completely absorbed in the acid liquor introduced into the tower and the exit solution from the tower contains ammonium nitrate, mono-ammonium phosphate and water. This solution may be evaporated for the recovery therefrom of a mixed nitrogen phosphorus fertilizer.

An ammonium nitrate-phosphoric acid solution of approximately the composition employed in the process described in the foregoing paragraph may be obtained by decomposing phosphate rock with about 50% nitric acid and an aqueous solution containing 40% ammonium sulfate. The reaction product obtained by thus treating phosphate rock, containing gypsum and a solution of ammonium nitrate and phosphoric acid, is filtered to recover the solution which is used for the absorption of ammonia as described above.

Instead of using an aqueous solution of an acid for the absorption of the ammonia from gases obtained by stripping the product from the urea synthesis, an acidic material such as superphosphate may be utilized. Thus, superphosphate prepared by acidulating phosphate rock with sulfuric acid, nitric acid or phosphoric acid may be placed in a rotating cylindrical drum and the ammonia and carbon dioxide containing gas from a stripper in which the urea synthesis effluent obtained by reacting in an autoclave carbon dioxide with an excess of ammonia over that required for formation of urea, for the recovery of unconverted ammonia and carbon dioxide is passed into the drum until the desired proportion of ammonia is absorbed by the superphosphate. The unabsorbed gas is vented from the drum. The ammonia reacts with the acidic constituents of the superphosphate to form ammonium salts. The resulting material is a valuable fertilizer containing both phosphorus and nitrogen.

The methods of producing urea and ammonium salts in accordance with this invention involve advantages of real practical importance in commercial operations. The difficulties heretofore encountered in utilizing the unconverted ammonia and carbon dioxide for the production of further quantities of urea are obviated and the cost of the operations for the recovery of the ammonia are compensated for by the valuable products obtained. The invention permits of operating the urea synthesis under the most favorable conditions as to the capital costs of the urea synthesis plant, corrosion of apparatus and formation of undesirable by-products, rather than requiring operations giving the maximum conversion of the ammonia and carbon dioxide to urea. Thus in the urea synthesis step a desired excess of ammonia may be employed and this ammonia economically recovered from the reaction product and a concentrated carbon dioxide gas directly obtained which may be economically returned to the urea synthesis stage.

In utilizing carbon dioxide for treatment of the urea synthesis effluent, a substantially complete stripping of unconverted ammonia and carbon dioxide is readily attained and the evolved gas is concentrated with respect to the two constituents. Although upon reducing the pressure employed in synthesizing the urea, the hot product will evolve a portion of the ammonia and carbon dioxide which it contains, it has heretofore been necessary to heat the material to a relatively high temperature in order to substantially completely remove the unconverted ammonia and carbon dioxide. This heating involved the supply of heat at relatively high temperatures which is not only costly as compared with supplying low temperature heat, but it also promoted decomposition of urea in the product. By employing carbon dioxide in accordance with this invention the product may be substantially freed of unconverted ammonia and carbon dioxide at relatively low temperatures, and the resulting mixture of ammonia and carbon dioxide economically treated for the recovery of its valuable constituents.

We claim:

1. In a process for the production of urea that improvement which comprises heating ammonia and carbon dioxide at a urea-forming temperature and pressure, and passing carbon dioxide in contact with the resulting product containing urea, ammonia and carbon dioxide to strip from the product ammonia and carbon dioxide.

2. The process for the production of urea and an ammonium salt which comprises heating ammonia and carbon dioxide at a urea-forming temperature and pressure, passing carbon dioxide in contact with the resulting product containing urea, ammonia and carbon dioxide to strip from the product ammonia and carbon dioxide, and reacting the ammonia in the resulting mixture of ammonia and carbon dioxide with an acid to form an ammonium salt.

3. The process for the production of urea and an ammonium salt which comprises heating ammonia and carbon dioxide at a urea-forming temperature and pressure, passing carbon dioxide in contact with the resulting product containing urea, ammonia and carbon dioxide to strip from the product ammonia and carbon dioxide, passing the resulting mixture of ammonia and carbon dioxide in contact with an acid material to absorb the ammonia and form an ammonium salt, and reacting the carbon dioxide with ammonia to form urea.

4. The process for the production of urea and an ammonium salt which comprises heating ammonia and carbon dioxide at a urea-forming temperature and pressure, passing carbon dioxide in contact with the resulting product containing urea, ammonia and carbon dioxide to strip from it the ammonia and carbon dioxide, passing the resulting gaseous mixture of ammonia and carbon dioxide in contact with a solution of ammonium sulfate containing free sulfuric acid to form ammonium sulfate, and reacting carbon dioxide thus separated from the ammonia with ammonia to form urea.

5. The process for the production of urea and an ammonium salt which comprises heating ammonia and carbon dioxide at a urea-forming temperature and pressure, passing carbon dioxide in contact with the resulting product containing urea, ammonia and carbon dioxide to strip from it the ammonia and carbon dioxide, passing the resulting gaseous mixture of ammonia and carbon dioxide in contact with a solution of ammonium nitrate containing free phosphoric acid to form ammonium phosphate, and reacting carbon dioxide thus separated from the ammonia with ammonia to form urea.

6. The process for the production of urea and an ammonium salt which comprises heating a reaction mixture of ammonia and carbon dioxide at a urea-forming temperature and pressure, said ammonia being present in said reaction mixture in excess of that amount required for reaction with the carbon dioxide to form urea, recovering from the resulting product uncombined ammonia and carbon dioxide at a temperature at which the ammonia and carbon dioxide remain in the gaseous phase, passing the resulting mixture of ammonia and carbon dioxide in contact with an acid material to absorb the ammonia and form an ammonium salt, and reacting the carbon dioxide with ammonia to form urea.

7. In a process for the production of urea that improvement which comprises heating ammonia and carbon dioxide at a temperature of about 150° to about 200° C. and under a pressure of about 100 to about 200 atmospheres to form urea by reaction of said ammonia and carbon dioxide, reducing the pressure on the reaction product containing urea, water, ammonia and carbon dioxide to evaporate water and evolve ammonia and carbon dioxide by the heat contained in the reaction product, with a simultaneous lowering in the temperature of said reaction product, and passing carbon dioxide in direct contact with the reaction product under the reduced pressure to strip therefrom ammonia and carbon dioxide.

8. In a process for the production of urea that improvement which comprises heating ammonia and carbon dioxide at a temperature of about 150° to about 200° C. and under a pressure of about 100 to about 200 atmospheres to form urea by reaction of said ammonia and carbon dioxide, reducing the pressure on the reaction product containing urea, water, ammonia and carbon dioxide to evaporate water and evolve ammonia and carbon dioxide by the heat contained in the reaction product, with a simultaneous lowering in the temperature of said reaction product, passing said reaction product at the reduced pressure in countercurrent flow and direct contact with a stream of carbon dioxide to strip from the product ammonia and carbon dioxide, and maintaining the temperature of the reaction product at the point at which it first contacts with the carbon dioxide and water vapor at a temperature of about 100° C.

9. The process for the production of urea and an ammonium salt which comprises separately liquefying gaseous ammonia and gaseous carbon dioxide, introducing the thus liquefied ammonia and carbon dioxide into an autoclave wherein the ammonia and carbon dioxide are heated at a urea-forming temperature and pressure, withdrawing the resulting reaction product from the autoclave and reducing the pressure on said product, passing gaseous carbon dioxide in contact with said product at the reduced pressure to strip therefrom ammonia and carbon dioxide, passing the resulting gaseous mixture of ammonia and carbon dioxide in direct contact with an acid to absorb the ammonia with the formation of an ammonium salt and then liquefying and returning to the aforesaid autoclave, for the production of additional quantities of urea, carbon dioxide unabsorbed by the said treatment of the mixture of ammonia and carbon dioxide with an acid.

10. The process for the production of urea and an ammonium salt which comprises separately liquefying gaseous ammonia and gaseous carbon dioxide, introducing the thus liquefied ammonia and carbon dioxide into an autoclave wherein the ammonia and carbon dioxide are heated at a temperature of about 150° to about 200° C. and under a pressure of about 100 to about 200 atmospheres to form urea, withdrawing the resulting reaction product from the autoclave and reducing the pressure on said product to evaporate water and evolve ammonia and carbon dioxide by the heat contained in the reaction product, with a simultaneous lowering in the temperature of said reaction product, passing gaseous carbon dioxide in countercurrent flow and direct contact with said product at the reduced pressure to strip therefrom ammonia and carbon dioxide, passing the resulting gaseous mixture of ammonia and carbon dioxide in direct contact with an acid to absorb the ammonia with the formation of an ammonium salt and then liquefying and returning to the aforesaid autoclave, for the production of additional quantities of urea, carbon dioxide unabsorbed by the said treatment of the mixture of ammonia and carbon dioxide with an acid.

CHARLES K. LAWRENCE.
HERMAN A. BEEKHUIS, Jr.